G. McI. SCOTT.
ADVERTISING DEVICE.
APPLICATION FILED SEPT. 19, 1914.
1,202,593.
Patented Oct. 24, 1916.
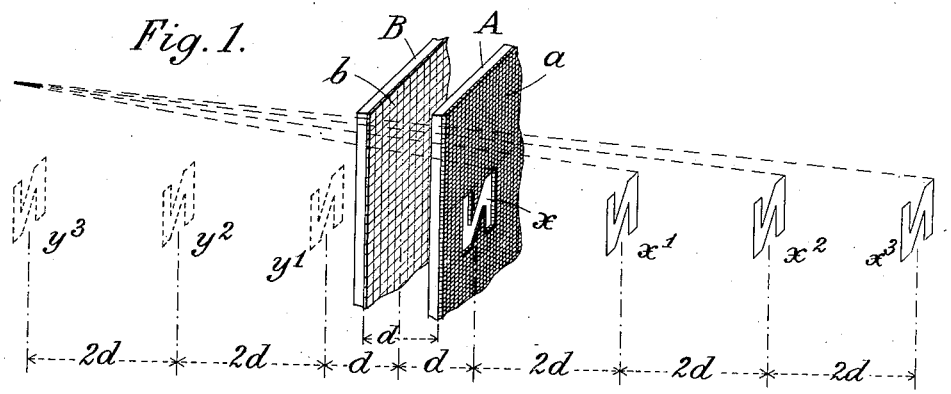
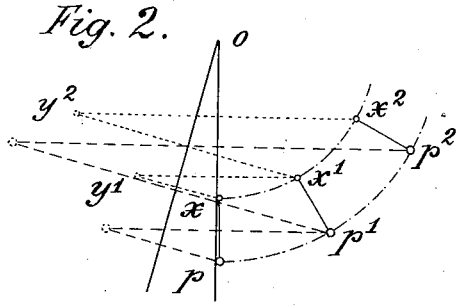
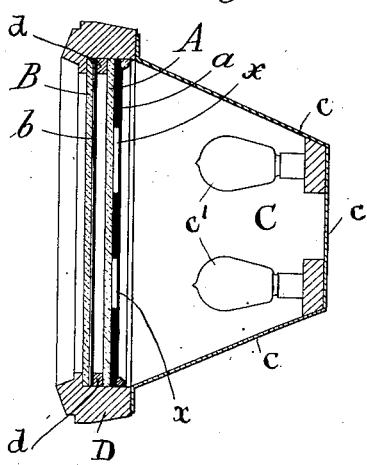
Inventor:
George McIntosh Scott,
by Wilkinson, Giusta & Mackay
Attorneys.

UNITED STATES PATENT OFFICE.

GEORGE McINTOSH SCOTT, OF LONDON, ENGLAND.

ADVERTISING DEVICE.

1,202,593.  Specification of Letters Patent.  Patented Oct. 24, 1916.

Application filed September 19, 1914. Serial No. 862,571.

*To all whom it may concern:*

Be it known that I, GEORGE MCINTOSH SCOTT, a subject of the King of England, residing at 59 Torrington Square, London, W., England, have invented certain new and useful Improvements in Advertising Devices, of which the following is a specification.

This invention relates to an advertising mirror device by means of which multiple images of a device, design, lettering or the like are produced. For this purpose two mirrors are employed, one behind the other at a slight distance apart. The front mirror is a translucent mirror, that is to say, a sheet of glass having a thin coating of silver or the like on its rear surface, the coating being sufficient to form a reflecting surface by reflected light, but sufficiently thin to be seen through by transmitted light. The rear mirror has a thick coating not transparent to transmitted light.

In the accompanying drawing, Figure 1 represents diagrammatically the formation of the images when both mirrors are plane and parallel, and Fig. 2, when the mirrors are inclined to one another. Fig. 3 represents the general effect obtained from a simple design with the arrangement according to Fig. 1, and Fig. 4 is a transverse sectional view through a practical embodiment of the device.

In Fig. 1, A is the rear mirror being an ordinary non-translucent mirror thickly coated on its back $a$ on which the design $x$ represented for simplicity by the letter N, is produced by removing the silvering by etching or otherwise so that the design is translucent or transparent. B is the front translucent mirror, parallel to A, with the reflecting surface $b$ on the rear or side adjacent to A. $d$ is the distance between the surface $b$ and the object $x$. An image $y_1$ of $x$ is produced at the distance $d$ from $b$ on the left hand of B; $y_1$ produces an image $x_1$ as far behind $a$ as $y_1$ is before $a$, that is at $2d$ from $a$; the image $x_1$ gives rise to an image $y_2$ by reflection from the mirror $b$, $y_2$ is distant $3d$ from $b$ and $4d$ from $a$ and produces an image $x_2$ at a distance of $4d$ from $a$, and so on. It will be noticed that the images are formed directly behind one another and at a distance apart, twice that separating the surface $a$ from the surface $b$, and by decreasing this distance the images are brought closer together, until they appear as a thickened or block-shaped sign. If the rear mirror on which the design is formed is inclined to the plane translucent mirror, each image of the same point of the design will lie in a circular arc, of which the center is the point of intersection of the two mirrors and the radius is the distance from the point of intersection to the said point.

In Fig. 2, A and B represent the reflecting surfaces of the mirrors, $x$ is any point of the design, $y_1, y_2$ . . . images to the left of B, $x_1, x_2$ . . . images, seen by the observer, to the right of A, which lie on a circle about the point of intersection O of the surfaces A and B, the radius of the circle being O $x$. Other points of the design, such as $p$, will similarly give rise to a series of images, $p_1$, $p_2$ . . . lying on a circle concentric with the former.

The design is preferably illuminated by one or more incandescent electric lamps, or other source of illumination, disposed in a closed opaque chamber at the back of the ordinary mirror, the sides of the chamber being formed of sheet tin or other reflecting material.

A practical form of the device is shown in Figs. 3 and 4 of the drawing. In a box or chamber C, formed or lined preferably with sheet tin $c$ or other reflecting material are arranged two electric lamps $c^1$ supplied with current from any convenient source. The front of this box is closed by a frame D in which the two mirrors B and A are mounted, being spaced apart by fillets $d$. The front mirror is translucent being lightly silvered on the back at $b$. The rear mirror A is heavily silvered on the back $a$, the silvering being removed at $x$ to represent the desired sign, in the case illustrated, the words "National signs." The design may be represented by plain glass, or etched glass, which may, if desired, be provided with a coating of transparent color or colors, and the back may, if desired, be varnished or provided with other ordinary protective coating.

By the expression design I intend to include any design, picture, pattern or lettering.

What I claim and desire to secure by Letters Patent is:—

1. A multiple image advertising device comprising a front sheet of transparent material and a translucent reflecting coating on said sheet in combination with a rear mirror having a translucent design thereon, substantially as set forth.

2. A multiple image advertising device comprising a front sheet of transparent material, and a translucent reflecting coating on said sheet in combination with a rear mirror having a translucent design thereon, said mirror being arranged at an angle to the transparent sheet substantially as set forth.

3. In a sign, the combination of a plurality of angularly-disposed mirrors, and a design associated therewith and adapted to be reflected between same, substantially as described.

4. In a device of the character described, the combination of a plurality of reflectors, and a design mounted in connection with one of said reflectors and arranged to be reflected back and forth between the latter to produce the effect of a multiple image, substantially as described.

In testimony whereof I have affixed my signature in presence of two witnesses.

GEORGE McINTOSH SCOTT.

Witnesses:
   ALBERT JONES,
   W. E. ROGERS.